(12) United States Patent
Andrews et al.

(10) Patent No.: US 7,839,566 B2
(45) Date of Patent: Nov. 23, 2010

(54) SURGICAL MICROSCOPY SYSTEM AND IMAGING METHOD

(75) Inventors: Delbert Peter Andrews, Oberkochen (DE); Peter Reimer, Ellwangen (DE)

(73) Assignee: Carl Zeiss Surgical GmbH, Oberkochen (DE)

( * ) Notice: Subject to any disclaimer, the term of this patent is extended or adjusted under 35 U.S.C. 154(b) by 266 days.

(21) Appl. No.: 12/163,906

(22) Filed: Jun. 27, 2008

(65) Prior Publication Data

US 2009/0323181 A1 Dec. 31, 2009

(51) Int. Cl.
*G02B 21/06* (2006.01)
*G02B 26/02* (2006.01)

(52) U.S. Cl. .................................... 359/385; 359/388

(58) Field of Classification Search .................. 359/385, 359/388
See application file for complete search history.

(56) References Cited

U.S. PATENT DOCUMENTS

| | | | | |
|---|---|---|---|---|
| 5,371,624 | A * | 12/1994 | Nagano et al. | 359/389 |
| 6,086,531 | A * | 7/2000 | Tomioka et al. | 600/178 |
| 7,385,757 | B2 * | 6/2008 | Moller et al. | 359/385 |
| 2003/0139650 | A1 * | 7/2003 | Homma | 600/181 |
| 2005/0117209 | A1 | 6/2005 | Moller et al. | |
| 2007/0076294 | A1 | 4/2007 | Kitajima | |
| 2007/0121106 | A1 * | 5/2007 | Shibata et al. | 356/237.2 |
| 2009/0316144 | A1 * | 12/2009 | Kobayashi | 356/239.2 |

FOREIGN PATENT DOCUMENTS

| | | |
|---|---|---|
| EP | 1 769 733 | 4/2007 |
| JP | 2009136578 A * | 6/2009 |
| JP | 2009140827 A * | 6/2009 |

OTHER PUBLICATIONS

Schott Glaswerke, "Optische Glasfilter", 1984, XP002494841, pp. 27, 28, 117, and 129.

* cited by examiner

*Primary Examiner*—Mark Consilvio
(74) *Attorney, Agent, or Firm*—Knobbe Martens Olson & Bear LLP

(57) ABSTRACT

A surgical microscopy system having an illumination system is provided. The illumination system comprises a xenon gas discharge lamp and a spectral filter which is optionally positionable into an illumination beam path of the surgical microscopy system and removable from the same. The spectral filter substantially exhibits, in a wavelength range between 400 nm and 700 nm, a transmission increasing from about 0.12 to 1 having a gradient between 0.025/nm and 0.0035/nm, in particular 0.00293/nm. Thus, the illumination system is enabled to provide light having two different spectral characteristics which is advantageous in particular for imaging structures in the human eye scattering to a different degree.

19 Claims, 5 Drawing Sheets

SURGICAL MICROSCOPY SYSTEM AND IMAGING METHOD

BACKGROUND OF THE INVENTION

1. Field of the Invention

The present invention relates to a surgical microscopy system and to an imaging method. Further the present invention relates to a surgical microscopy system having an illumination system and to a method of usage of the same. In particular, the present invention relates to a surgical microscopy system having an illumination system suitable for ophthalmologic surgeries.

2. Description of the Related Art

From DE 10 2004 005 428 a surgical microscope for ophthalmology is known, wherein a xenon illumination light source or a metal halogenide illumination light source is used for illuminating an object. Thereby, not both illumination light sources are integrated into the surgical microscope so that a purchaser of such a surgical microscope has to decide in favour of one of the illumination light sources. In particular, for performing ophthalmologic surgeries such conventional surgical microscope has disadvantages.

SUMMARY OF THE INVENTION

The present invention has been accomplished taking the above problems into consideration.

An object of the present invention is, to provide a surgical microscope which is capable to image structures having different optical characteristics in the human eye. A further object of the present invention is to provide a method to image these structures having different optical characteristics during an ophthalmologic surgery.

According to a first aspect of the present invention, a surgical microscopy system is provided, comprising an illumination system for illuminating an object region with illumination light along an illumination beam path, and an optical imaging system for generating an image of the object region, wherein the illumination system comprises a xenon gas discharge lamp for generating at least the illumination light and a spectral filter optionally positionable into the illumination beam path and removable from the same, wherein the spectral filter has a filter characteristics satisfying for a wavelength range between 400 nm and 700 nm, the relations $$f^*(m^*\lambda + b - \Delta b) \leq A(\lambda) \leq f^*(m^*\lambda + b + \Delta b);$$

0.0025/nm $\leq$ m $\leq$ 0.0035/nm;

b=−1.053;

f$\leq$1; and $\Delta$b$\leq$0.3; in particular $\Delta$b$\leq$0.15; further in particular $\Delta$b$\leq$0.1, wherein it is set $A(\lambda)$=0, if $A(\lambda)$ is smaller than zero according to the above relations, wherein it is set $A(\lambda)$=f, if $A(\lambda)\geq 1$ according to the above relations, and wherein $\lambda$ represents a wavelength of the illumination light and $A(\lambda)$ represents a ratio between an intensity of light emanating from the spectral filter along the illumination beam path and an intensity of light coming from the xenon gas discharge lamp and being incident onto the spectral filter. $\Delta$b thereby is greater or equal to zero.

f in the above relation represents a general attenuation of light filtered by the spectral filter, wherein the attenuation factor is constant in the wavelength range between 400 nm and 700 nm. The factor f being a constant attenuation factor does not influence a shape of a spectrum of light emanating from the spectral filter but does merely effect an overall intensity of light having the spectrum.

According to an embodiment of the present invention, the attenuation factor f is greater than 0.9, in particular f is equal to one, f=1.

According to this aspect of the invention, an object region is imaged. Thereby, the object region is understood to be a region where an illuminated region of an object overlaps with an imaged region of the object. The illuminating the object region with illumination light is carried out along an illumination beam path. The illumination beam path thereby indicates a path of light emanating from the xenon gas discharge lamp and being incident onto the object region. The illumination beam path may thereby comprise a plurality of straight, and also not parallel sections. The optical imaging system is understood to be an optical system comprising a plurality of optical elements, such as lenses and/or mirrors which are arranged and adapted to generate an image from the object region. Thereby, the image may for example be an intermediate image in an optical system which in turn is imaged to the retina of an observer, or it may for example be an image generated by a camera and displayed on a display device. Further, the image may be acquired by a camera and may be projected onto a screen.

A xenon gas discharge lamp comprises a light source in which by electron excitation and recombination processes in a plasma light is generated in a volume containing xenon. The xenon gas discharge lamp may comprise a bulb filled with xenon gas. The filling of the bulb may contain further chemical elements, such as mercury, amounting to at most a fraction of a total weight of elements filled into the bulb of 5 weight percent. Typically, in the bulb two electrodes are provided across which a high voltage pulse may be applied for starting the lamp. Particularly advantageous for a surgical microscopy system are such xenon gas discharge lamps in which a predominant portion of light is generated in small volumes around the two electrodes. Thus, a precise focussing of the light emanating from such a xenon gas discharge lamp is possible. A spectral characteristics of light of a xenon gas discharge lamp is very similar to a spectral characteristics of daylight. This daylight similar light is in particular suitable for imaging certain structures of the human eye. Due to the large fraction of blue light of the xenon light scattering structures or variations in the cornea, the anterior and posterior eye chamber of the lens and in the vitreous body are better observable than using light having a lower fraction of blue light. Examples for such structures and/or variations in the human eye may be for example cicatrices in the cornea, cloudiness in the aqueous humour, lens capsule and capsulorhexis, remains of the lens in the lens capsule, cloudiness in the lens, cloudiness and membranes in the vitreous body. Upon illuminating using light having a lower fraction of blue light than the light of the xenon gas discharge lens such structures would be imaged having lower contrast.

A spectral filter is an optical element modifying a spectral characteristic of light emanating from the spectral filter compared to a spectral characteristics of light being incident onto the spectral filter. The modification thereby may be described as a ratio between an intensity of light emanating from the spectral filter and an intensity of light being incident onto the spectral filter. When the spectral filter is adapted as a transmission spectral filter, this ratio corresponds to the transmission characteristics of the transmission spectral filter. Thereby the spectral filter may be for example adapted as an interference filter. This interference filter reflects or transmits one or several spectral bands according to the filter characteristics. In particular advantageous are interference filters, because they absorb light only to a small amount and thus a heating during an operation is low.

The parameter m may satisfy the relation $0.00275/nm \leq m \leq 0.00325/nm$; in particular $0.00285/nm \leq m \leq 0.00305/nm$, more in particular $m=0.00293/nm$. The parameter $\Delta b$ may satisfy the relation $\Delta b \leq 0.075$. Disregarding the constant attenuation factor f, i.e. setting f equal to one in the above relations, the ratio $A(\lambda)$ of light intensities defined above lies, in a wavelength range between 400 nm and 700 nm, between two straight lines having a gradient m with $0.0025/nm \leq m \leq 0.0035/nm$, in particular $m=0.00293/nm$ and having an axis intercept of −1.353 and −0.753, respectively; in particular −1.203 and −0.903, respectively, further in particular −1.153 and −0.953, respectively, and further in particular −1.128 and −0.978, respectively. Thereby the ratio $A(\lambda)$ is set to zero, if the ratio is smaller than zero according to one of the two straight lines. By two axes intercepts and one gradient a lower and an upper line is defined between of which the value of $A(\lambda)$ of the filter characteristics of the spectral filters lies. In the following table 1 parameters of straight lines for defining of upper and lower straight lines are exemplarily given:

TABLE 1

| Example | Axis intercept of the lower straight line | Axis intercept of the upper straight line | Gradient m |
| --- | --- | --- | --- |
| 1 | −1.353 | −0.753 | 0.0025/nm |
| 2 | −1.203 | −0.903 | 0.0025/nm |
| 3 | −1.153 | −0.953 | 0.0025/nm |
| 4 | −1.128 | −0.978 | 0.0025/nm |
| 5 | −1.353 | −0.753 | 0.00293/nm |
| 6 | −1.203 | −0.903 | 0.00293/nm |
| 7 | −1.153 | −0.953 | 0.00293/nm |
| 8 | −1.128 | −0.978 | 0.00293/nm |
| 9 | −1.353 | −0.753 | 0.0035/nm |
| 10 | −1.203 | −0.903 | 0.0035/nm |
| 11 | −1.153 | −0.953 | 0.0035/nm |
| 12 | −1.128 | −0.978 | 0.0035/nm |

Light of the xenon gas discharge lamp being filtered by the inventive spectral filter has the following spectral properties again assuming that the constant attenuation factor f is equal to one: Light having wavelengths below 400 nm is essentially suppressed. Thus, a fraction of ultraviolet light of the filtered light is low. This is in particular advantageous in ophthalmologic surgeries, because portions of the human eye may be damaged by ultraviolet light. The large fraction of blue light of the xenon light is significantly decreased in the filtered light. By the decrease the fraction of blue light of the filtered light compared to the fraction of blue light of the xenon light, the filtered light causes less scattering at structures of the eye than the xenon light. Using such a filtered light a so-called "red-reflex" may be advantageously exploited for the imaging of the human eye. Thereby, by reflection at the retina of the eye red-orange light arises that may improve the visibility of eye structures. Further, less potentially disturbing stray light is generated using the illumination with the filtered light.

The inventive surgical microscopy system enables to optionally position the spectral filter having the above-described filter characteristics into the illumination beam path and to remove it from the same. Thus, alternatively, light generated by the xenon gas discharge lamp may be utilized as illumination light, when the spectral filter is removed from the illumination beam path or light generated by the xenon gas discharge lamp and filtered by the spectral filter may be provided as illumination light, when the spectral filter is positioned in the illumination beam path.

In the context of the present application, a spectral filter is positioned in the illumination beam path, if at least eighty percent of an intensity of light being incident onto the object region emanates from the spectral filter. Thus, the spectral filter is presumed to be positioned in the illumination beam path also in the case, if up to twenty percent of intensity of stray light being incident onto the object region does not arise from light emanating from the spectral filter. This stray light not emanating from the spectral filter may for example be light of an illumination of an environment, or light coming from the xenon gas discharge lamp and being directly incident onto the object region. The spectral filter is presumed to be removed from the illumination beam path, if at most twenty percent of an intensity of light being incident onto the object region emanates from the spectral filter.

Thus, the surgical microscopy system according to the present invention provides, using a single xenon gas discharge lamp, illumination light for imaging an object region, wherein a spectral characteristics of the illumination light may advantageously be varied. In particular, the spectral characteristics of the filtered light resembles a spectral characteristics of halogen light having a particular colour temperature (3200 K).

For imaging certain low scattering structures in the eye of a patient, illumination light having a spectral characteristics resembling the one of xenon light is beneficial, whereas for other imaging situations the utilization of illumination light having a spectral characteristics resembling the one of a halogen light source is advantageous. Thus, a user of the inventive surgical microscope may optimize an illumination light during a surgery with respect to structures to be imaged, to improve a success of the surgery.

According to an embodiment of the present invention, the spectral filter is configured as a transmission spectral filter. Thereby light of the xenon gas discharge lamp is incident at one side onto the transmission spectral filter and leaves the transmission spectral filter at another side thereof. Hereby, the filter characteristics corresponds to the spectral transmission characteristics of the transmission spectral filter.

According to an embodiment of the present invention, the spectral filter comprises a substrate and a plurality of layers of different dielectric materials, wherein the layers are mounted on the substrate. By providing a plurality of layers comprised of different dielectric materials, wavelength dependent interference effects arise. Traversing or reflected light of particular wavelengths thereby may partially destructively or constructively interfere relative to traversing or reflected light having other wavelengths, leading to attenuation or amplification of an intensity of light having these wavelengths, respectively.

According to an embodiment of the present invention, the surgical microscopy system further comprises a user interface for positioning the spectral filter into the illumination beam path and removing the spectral filter from the illumination beam path by a user. The spectral filter may for example be positioned into the illumination beam path or removed from the same, by displacing the spectral filter relative to a stationary illumination beam path by a user. The displacing may comprise translating and/or rotating. Another possibility to position the spectral filter into the illumination beam path or to remove it from the same is to change the course of the illumination path, wherein the spectral filter is stationary. This may for example be carried out by optical elements, such as for example mirrors and/or prisms. Also, light ducts may for example be applied.

The user interface may for example comprise the possibility to manually displace the spectral filter relative to the illumination beam path. Thereby, the spectral filter may for example be shifted perpendicular to a direction of the illumination beam to position the spectral filter into the illumination beam path and to remove it from the same. Further, the user interface may comprise a switch and/or an input device, such as a console, to trigger a desired positioning of the spectral filter.

According to an embodiment of the present invention, the illumination system comprises a light duct to guide a light along at least a portion of the illumination beam path. In particular, advantageous is an employment of a flexible light duct. Using a flexible light duct, for example an illumination position from which the object region is illuminated may conveniently be varied. A variation of the illumination position in turn may be advantageous to enable to optimally illuminate the object region and thus to enable achieving an improved imaging.

According to an embodiment of the present invention, the illumination system further comprises a light emitting diode (LED) for generating light in the wavelength range between 400 nm to 850 nm, wherein the light of the LED is combinable to the light of the xenon gas discharge lamp. Thus, light combined of light generated by the LED and light generated by the xenon gas discharge lamp in a filtered or a not filtered manner may be used as illumination light. By providing at least one such LED a fine adjustment of the spectral characteristics of the illumination light may be performed, advantageously effecting the illumination.

According to an embodiment of the present invention, the surgical microscopy system further comprises an actuator, to position the spectral filter into the illumination beam path and to remove it from the illumination beam path. The actuator may comprise thereby for example an electro motor which is adapted to displace the spectral filter. The displacing may thereby comprise translating and/or rotating. The actuator may thereby be controlled by a control unit operated by a user.

According to an embodiment of the present invention, the illumination system is adapted to direct the illumination light to the object region according to an illumination light angle for illuminating the object region, wherein the illumination light angle measured between an optical axis of the imaging system and an optical axis of an illumination optics having the spectral filter positioned in the illumination beam path is equal to the illumination light angle having the spectral filter removed from the illumination beam path. According to this embodiment, it is ensured that a illumination light angle does not change, when the spectral filter is positioned in the illumination beam path and is removed from the same, respectively. Thereby, the illumination light angle is measured between an optical axis of the imaging system of the surgical microscopy system and an optical axis of the illumination optics. In particular, when the illumination optics comprises several optical elements not all disposed along a straight line, the optical axis of the illumination optics is presumed to be a direction of the illumination beam path in a region comprising a point of incidence of the illumination light onto the object region. Keeping the illumination light angle constant during switching the illumination light enables easily associating object details visible before and after switching the illumination light. Varying the illumination light angle concurrently with switching the illumination light could otherwise cause occurrence of reflexes or shadings upon illumination according to one of the two different illumination light angles hampering recognizing an object detail after switching the illumination light and concurrently switching the illumination light angle.

According to an embodiment of the present invention, the filter characteristics of the spectral filter satisfies for wavelengths below 400 nm, the relation $A(\lambda) \leq f*0.1$, and for wavelengths above 700 nm substantially the relation $A(\lambda)=f$. In particular, the constant attenuation factor f may be greater than 0.9, in particular equal to one. Thereby, in particular, it is achieved that light emanating from the spectral filter exhibits a decreased fraction of ultraviolet light compared to a fraction of ultraviolet light of the light being incident onto the spectral filter that may decrease radiation damage of an object to be examined.

According to a second aspect of the present invention, a method for imaging an object region is provided, wherein the method comprises illuminating the object region along an illumination beam path with illumination light and imaging the object region, wherein light of a xenon gas discharge lamp is used as illumination light which is filtered by a spectral filter, wherein the spectral filter has a filter characteristics which, for a wavelength range between 400 nm and 700 nm satisfies the relations $f*(m*\lambda+b-\Delta b) \leq A(\lambda) \leq f*(m*\lambda+b+\Delta b)$;

$0.0025/nm \leq m \leq 0.0035/nm$;

$b=-1.053$;

$f \leq 1$; and $\Delta b \leq 0.3$; in particular $\Delta b \leq 0.15$; further in particular $\Delta b \leq 0.1$, wherein it is set $A(\lambda)=0$ if $A(\lambda)$ is smaller than zero according to the above relations, wherein it is set $A(\lambda)=f$, if $A(\lambda) \geq 1$ according to the above relations, and wherein $\lambda$ represents a wavelength of the illumination light and $A(\lambda)$ represents a ratio between an intensity of light emanating from the spectral filter along the illumination beam path and an intensity of light coming from the xenon gas discharge lamp and being incident onto the spectral filter.

According to an embodiment of this aspect of the present invention, the object region is at least a portion of a human eye. As described above, it may be, depending on the examination conditions and the structures to be imaged, advantageous to use light of a xenon gas discharge lamp as illumination light or light of a xenon gas discharge lamp filtered by the spectral filter having the above defined filter characteristics.

BRIEF DESCRIPTION OF THE DRAWINGS

The forgoing as well as other advantageous features of the invention will be more apparent from the following detailed description of exemplary embodiments of the invention with reference to the accompanying drawings. It is noted that not all possible embodiments of the present invention necessarily exhibit each and every, or any, of the advantages identified herein.

DETAILED DESCRIPTION OF THE PREFERRED EMBODIMENT

Figure 1:
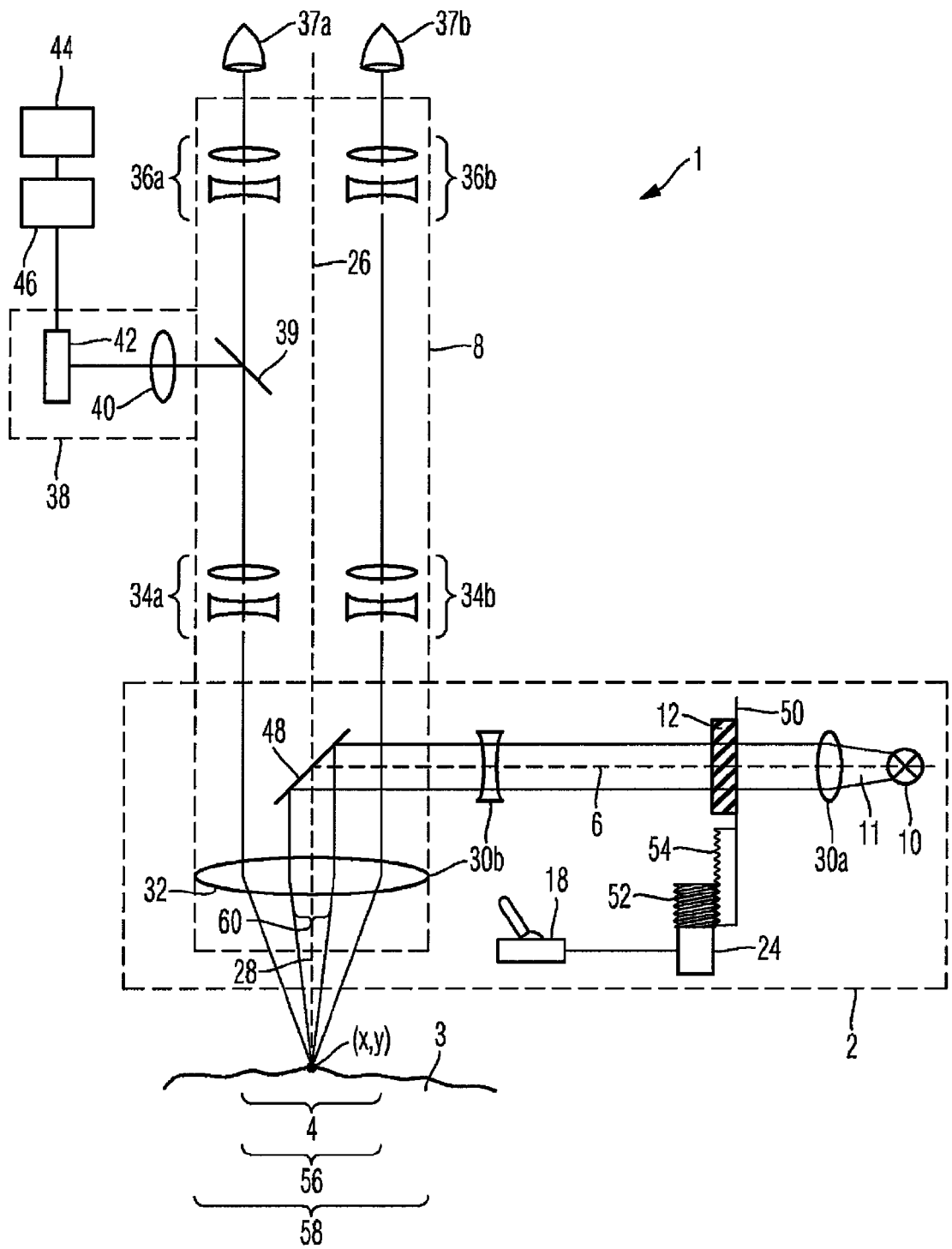
FIG. 1 illustrates a surgical microscopy system according to an embodiment of the present invention.

In the exemplary embodiments described below, components that are alike in function and structure are designated as far as possible by alike reference numerals. Therefore, to understand the features of the individual components of a specific embodiment, the descriptions of other embodiments and of the summary of the invention should be referred to.

FIG. 1 shows a surgical microscopy system 1 according to an embodiment of the present invention. The surgical microscopy system 1 comprises an optical imaging system 8 for imaging an object region 4 of an object 3, as well as an illumination system 2 for illuminating the object region 4. The optical imaging system 8 comprises an objective 32, a zoom system 34a and 34b, respectively, and an ocular system 36a and 36b, respectively, for stereoscopic imaging an object region. Light emanating from a point (x, y) of the object region 4 traverses the objective 32, traverses for stereoscopic imaging the zoom system 34a and 34b, respectively, and then traverses the ocular system 36a and 36b, respectively. Reference numeral 26 indicates an optical axis of the imaging system. The eyes 37a and 37b of a user can observe the object region 4 stereoscopically by looking through the ocular system 36a and 36b, respectively. In one of the partial beam paths leading to the eye 37a of the user in this embodiment, a beam splitter 39 is arranged which deflects a portion of the light emanating from the point (x, y) of the object region 4 and led through the objective 32 and the zoom system 34a so that it is led into the camera 38. The camera 38 comprises a camera imaging optics 40 and a positionally resolving detector 42 comprising a plurality of pixels to which the object region 4 of the object 3 is imaged. The individual pixels of the detector 42 detect intensities of light being incident thereto and generate corresponding output signals. These output signals are supplied to a data processing and storage unit 46. The data processing and storage unit 46 is adapted, to receive the output signals of the detector 42 of the camera 38 and to store these. After receiving the output signals of the pixels of the detector 42 the data processing and storage unit 46 converts the signals so that they can be output to a monitor 44 and can be displayed as an image. At the monitor 44 also two images of two sets of output signals may be displayed side by side or superimposed with each other, in particular images which are obtained upon illumination having the spectral filter 12 positioned in the illumination beam path 6 and removed from the illumination beam path 6 (see below). A corresponding beam splitter may also be disposed in a beam path traversing through the zoom system 34b and the ocular system 36b. Similarly, along a thus deflected beam path, a further camera may be disposed which is connected to the data processing and storage unit 46.

The illumination system 2 comprises a xenon gas discharge lamp 10 for generating xenon light 11. The xenon light 11 is collimated by a collimating optics 30a and traverses a spectral filter 12 by which it is spectrally filtered. The spectral filter 12 is displacable along a guide rail perpendicular to a direction of an illumination beam path 6. For displacement of the spectral filter 12 in this embodiment a motor 24 is utilized, wherein a spiral thread 18 is disposed at its motor shaft. The spiral thread 18 engages to a thread rail 54 which is mounted at the spectral filter 12. Rotating the motor 24 in a first direction moves the spectral filter 12 along the guide rail upwards in FIG. 1 so that it is positioned into the illumination beam path 6 and rotating the motor 24 the other direction moves the spectral filter downwards so that the spectral filter 12 is removed from the illumination beam path 6. Alternatively to such a type of filter displacement a filter wheel may be employed, wherein the filter is mounted at a wheel and by turning the wheel the spectral filter may be positioned into the illumination beam path and may be removed from the same. The motor 24 in this embodiment may be controlled by the switch 18 from a user. Using the switch 18 the user may dispose the spectral filter 12 into the illumination beam path and may remove the spectral filter from the illumination beam path. The spectral filter 12 changes the spectral characteristics of the xenon light 11 which is collimated by the collimating optics 30a as described in detail below.

Along the illumination beam path 6 the light generated by the xenon gas discharge lamp 10 is incident onto a mirror 48 from which it is reflected to traverse the objective 32 along the optical axis of the imaging system 26 and finally to be incident at a point (x, y) of the object region 4. In FIG. 1, for exemplary purpose, merely the illumination of the point (x, y) of the object region 4 is illustrated. All together, however, an illuminated region 58 of the object 3 is illuminated by the illumination system 2. A region 56 imaged by the optical imaging system is smaller in area than the illuminated region 58. A region, where the illuminated region 58 overlaps with the imaged region 56, is the object region 4.

From FIG. 1 it is apparent that an illumination light angle 30 measured between the optical axis 26 of the imaging system 8 and an optical axis 28 of the illumination optics 30b is zero degree. It is also apparent that this illumination light angle does not change when the spectral filter 12 is positioned in the illumination beam path 6 or is removed from the same.

Figure 2:
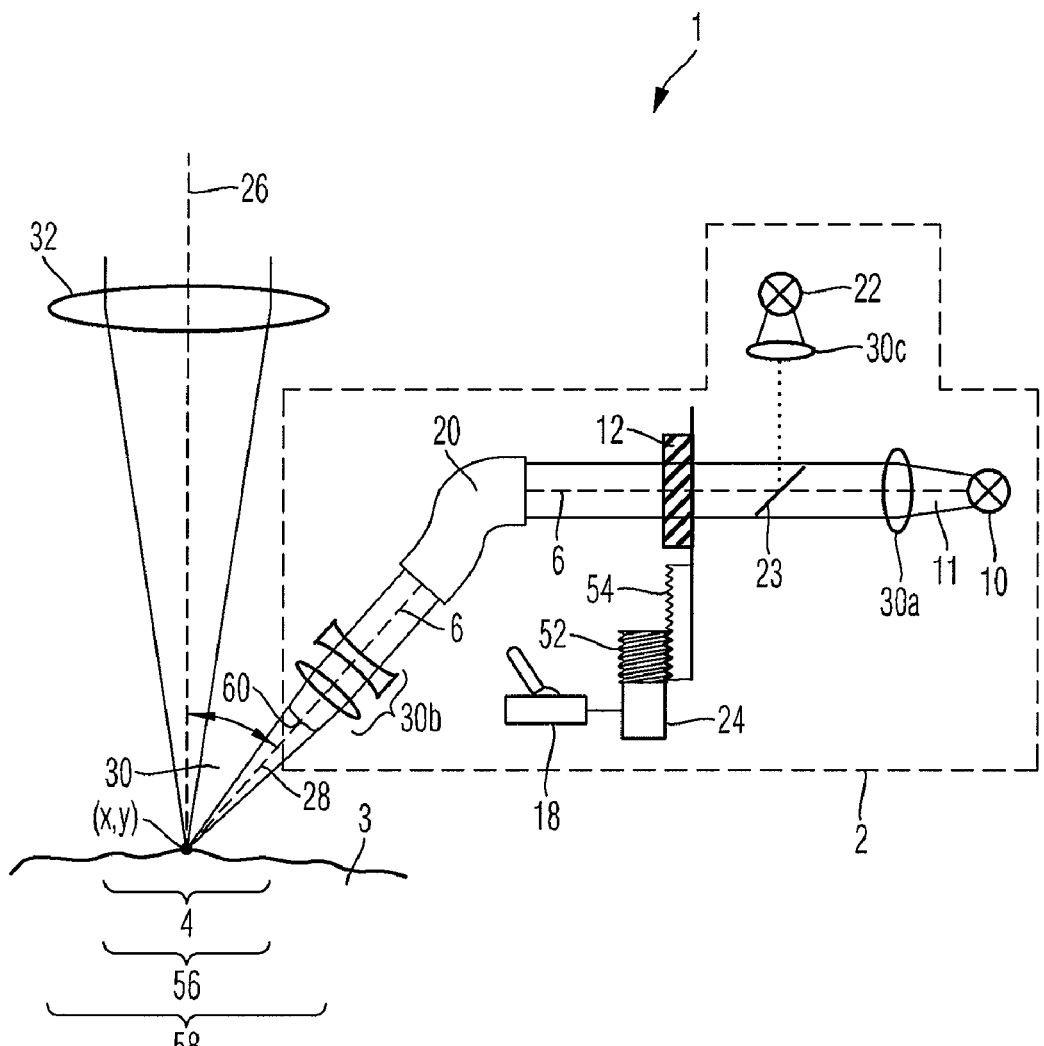
FIG. 2 schematically shows a partial view of a surgical microscopy system according to a further embodiment of the present invention.

FIG. 2 schematically shows a partial view of a surgical microscopy system according to a further embodiment of the present invention. In this Figure merely the objective 32 is illustrated as the sole part of the optical imaging system. In contrast to the embodiment illustrated in FIG. 1 in this embodiment illumination light 60 does not traverse the objective 32 of the optical imaging system 8. While in the embodiment illustrated in FIG. 1, the objective 32 of the optical imaging system 8 acts as a part of an illumination optics 30b of the illumination system 2, the illumination system 2 of the embodiment illustrated in FIG. 2 comprises an illumination optics 30b separate from the objective 32. As the embodiment illustrated in FIG. 1, the illumination system 2 of the embodiment illustrated in FIG. 2 comprises a xenon gas discharge lamp 10 which is adapted to generate xenon light 11. Light of a light emitting diode (LED) 22 traverses a collimating optics 30c and is deflected by a semitransparent mirror 23 at a right angle that means is orthogonally deflected. The light emitting diode may in this embodiment be adapted to primarily emit light in a yellow and/or red spectral range. The xenon light 11 collimated by the collimating optics 30a and the light of the LED 22 collimated by the collimating optics 30c and deflected at the mirror 23 traverses the spectral filter 12 to be coupled into a flexible light guide 20. The thus combined filtered light of the LED 22 and of the xenon gas discharge lamp 10 traverses an illumination optics 30b to provide illumination light 60 for illuminating the point (x, y) of the object region 4. In this embodiment, the spectral filter 12 is positionable into the illumination beam path 6 and removable from the same, respectively, as in the embodiment illustrated in FIG. 1. From FIG. 2 it is apparent that in this embodiment an illumination light angle 30 between the optical axis 26 of the imaging system and the optical axis 28 of the illumination optics 30b is not zero and it is kept unchanged upon positioning and removing the spectral filter 12 into the illumination beam path 6 and from the illumination beam path 6, respectively. By utilizing the flexible light guide 20 it is possible to adjust the illumination light angle 30 freely in a large angle region. Thus, by manually experimenting and concurrently observing the object region 4 a suitable illumination light angle 30 may be chosen. It should be noted that in the embodiment illustrated in FIG. 1 a light guide may also be employed in the illumination beam path 6 of the illumination system 2. Also, the light of the xenon gas discharge lamp 10 may be combined with light emitted from one or several LEDs 22. This filter may also be employed for endo-illuminators for intraocular illumination.

FIGS. 3A, 3B, 3C and 3D schematically show embodiments of illumination systems according to the present invention. In all four Figures the xenon gas discharge lamp 10, the collimating optics 30a, the spectral filter 12 and the illumination optics 30b are schematically illustrated along an illumination beam path 6, as well as the object region 4. A double arrow indicated near an element indicates in any of these Figures a possible movement of this element to position the spectral filter into the illumination beam path and to remove it from the same, respectively. In the four embodiments, the spectral filter 12 is positioned into the illumination beam path 6 and 6' and removed from the same, respectively, in different manners.

Figure 3A:
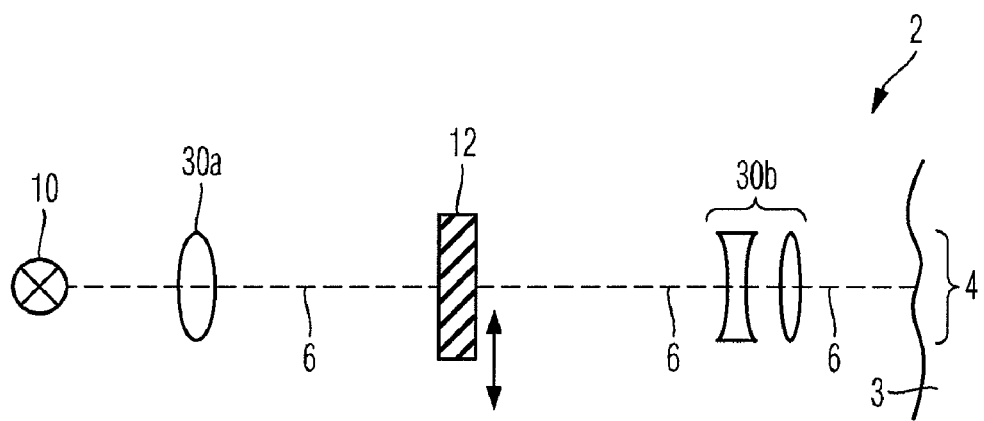
FIGS. 3A-3D illustrate embodiments of the illumination system according to the present invention.

In FIG. 3A the illumination beam path 6 is stationary and the spectral filter 12 is displaced perpendicular to a direction of the illumination beam path 6, to position it into the same and to remove it from the same, respectively, similarly as illustrated in FIGS. 1 and 2.

Figure 3B:
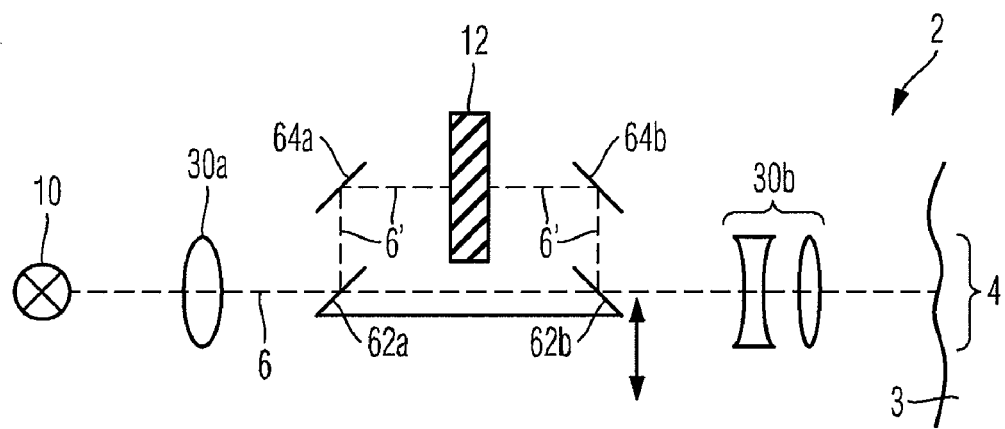

In FIG. 3B in contrast the spectral filter is stationary. To position the spectral filter into the illumination beam path, a pair of mirrors 62a and 62b is translated in a direction perpendicular to the illumination beam path 6 (vertically in FIG. 3B) so that light emanating from the xenon gas discharge lamp 10 and collimated by the collimating optics 30a is guided along an illumination beam path 6' using the pair of mirrors 64a and 64b, which illumination beam path 6' is modified compared to the illumination beam path 6, wherein the spectral filter 12 is positioned in the modified illumination beam path 6'.

Figure 3C:
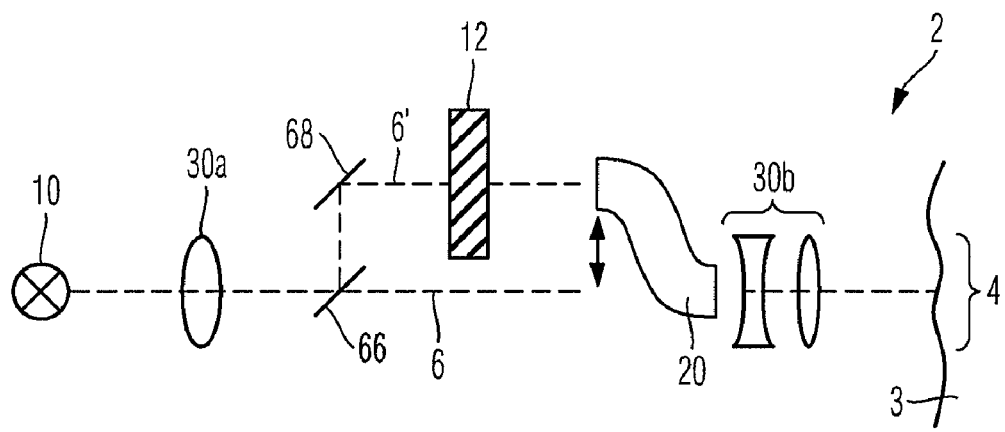

In the embodiment of the illumination system 2 illustrated in FIG. 3C further a semitransparent mirror 66 and mirror 68 are provided. Light emanating from the xenon gas discharge lamp 10 and collimated by the collimating optics 30a is divided in two partial beams along two illumination beam paths 6 and 6', respectively, at the semitransparent mirror 66. Light propagating along the illumination beam path 6' is reflected at the mirror 68 to traverse the spectral filter 12. By displacing an entry aperture of the light guide 20 perpendicular to the illumination beam path 6 and 6', respectively, it is possible to provide either light propagating along the illumination beam path 6 or light propagating along the illumination beam path 6' as illumination light 60 for illuminating the object region 4.

Figure 3D:
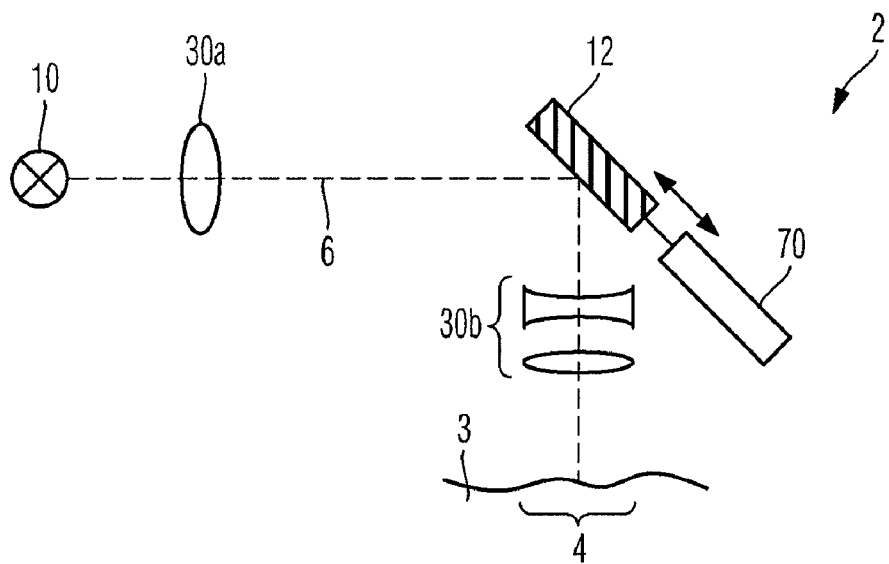

FIG. 3D shows an embodiment of the illumination system 2 of the present invention, wherein a reflection spectral filter is used as the spectral filter 12. The reflection spectral filter 12 is mounted beside a mirror 70, wherein both elements are translatable in a coupled manner along a guide rail aligned in an angle of 45° relative to a direction of the illumination beam path 6. Depending on a translation position the light emanating from the xenon gas discharge lamp 10 and collimated by the collimating optics 30a either is incident onto the spectral filter 12 or the mirror 70. In the former case filtered light and in the latter case unfiltered light is incident onto the object region 4 for illumination.

In the embodiments according to FIGS. 3A to 3D the displacing the spectral filter 12 and/or the illumination beam path 6 may be carried out in a coupled manner or separately and the displacing may be carried out manually or using an appropriate driving apparatus such as an electro motor. Instead of or additional to a translation also a rotation may be carried out to position the spectral filter into the illumination beam path and to remove it from the same, respectively.

Figure 4:
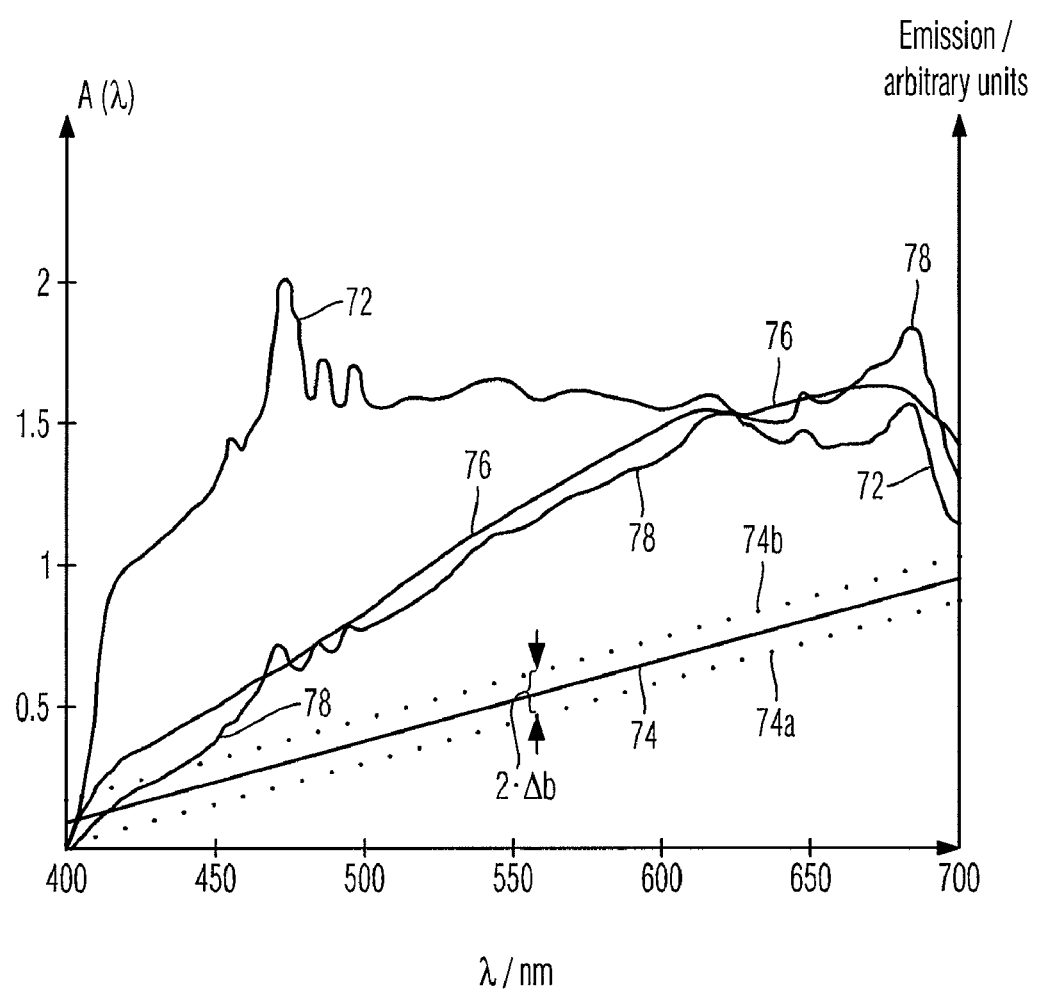
FIG. 4 illustrates a filter characteristics of a spectral filter according to an embodiment of the present invention in the form of a diagram.

FIG. 4 illustrates a filter characteristics 74 of a spectral filter according to the embodiment of the present invention. The x-axis of the diagram of FIG. 4 represents a wavelength of light measured in units of nanometer. The y-axis represents an intensity of a light emission of a xenon gas discharge lamp 72 and a halogen lamp 76 (here in unites power per area per wavelength, mW/(cm2*nm)) and a transmission characteristics 74 (A(λ)) of a spectral filter according to an embodiment of the present invention. Emission spectra 72, 76 of different light sources are depicted together with a transmission characteristics 74 of a spectral filter 12 in this diagram to illustrate advantageous effects of the employment of the inventive spectral filter 12. Disregarding three emission peaks in the range from about 460 to 500 nm the emission spectrum 72 of a xenon gas discharge lamp 10 exhibits a substantially constant course. An emission spectrum constant across the variable wavelength range corresponds approximately to an emission spectrum of sunlight at noon time. Thus, for an observer light of a xenon gas discharge lamp 10 appears white. In comparison to the emission spectrum 72 of the xenon gas discharge lamp 10 the spectrum 76 of a halogen lamp shows significantly lower intensities at wavelengths between 400 and 450 nm. Thus, a fraction of blue light of a halogen lamp is reduced in comparison to a fraction of blue light of a xenon gas discharge lamp and accordingly light of a halogen lamp appears comparably more reddish to an observer. Light having a spectrum 72 generated by a xenon gas discharge lamp 10 as well as light having a spectrum 76 generated by a halogen lamp may in an advantageous way be utilized as illumination light 60 of a surgical microscopy system. This is in particular beneficial for imaging a portion of a human eye. For imaging low scattering structures in the eye in particular light having an emission spectrum 72 is suited, whereas a particularly intensive "red reflex" is obtained by utilizing light having an emission spectrum 76.

A filter characteristics of a spectral filter 12 according to an embodiment of the present invention is in the diagram in FIG. 4 illustrated as a straight line 74. It is apparent that a transmission of the spectral filter 12 according to this embodiment of the present invention increases linearly in dependence of the wavelength in a wavelength range between about 400 and 700 nm. Such a spectral filter having substantially a linear filter characteristics is particularly simply and economically be made. An intensity of light emanating from the spectral filter having a certain wavelength may be obtained by multiplying an intensity of light having this wavelength being incident onto the spectral filter and the filter characteristics of the spectral filter taken at this wavelength. A spectrum of light emanating from a spectral filter in a wavelength range may be obtained by computing intensities of light having wavelengths in this wavelength range emanating from the spectral filter. A result of such a multiplication of the emission spectrum 72 of the xenon gas discharge lamp with the transmission characteristics 74 of the spectral filter according to an embodiment of the present invention is depicted as curve 78 in the diagram of FIG. 4. The curve represents thus intensity of light of a xenon gas discharge lamp filtered by the inventive spectral filter. In a wavelength range above about 650 nm the intensity of the filtered light (curve 78) lies above the intensity of the light of the xenon gas discharge lamp (curve 72) being incident onto the spectral filter. This effect may for example intentionally be achieved by utilizing a conversion filter which converts (such as by utilizing fluorescent effects) portions of light of a first wavelength range into light of a second wavelength range. The second wavelength range thereby may comprise higher wavelengths than the first wavelength range. In the embodiment illustrated such a filter is not utilized. The intensity of the filtered light only appears, due to missing normalizing the curves, above the intensity of the light being incident onto the spectral filter.

It is apparent that a spectrum of such filtered light only slightly deviates from an emission spectrum 76 of a halogen lamp when a suitable normalizing is performed. By positioning a spectral filter 12 according to the embodiments of the present invention into an illumination beam path 6 light of a xenon gas discharge lamp 10 may be generated resembling in its spectrum light of a halogen lamp. According to an embodiment, the filter characteristics of the spectral filter lies between two straight lines 74a and 74b, depicted as pointed straight lines and having a vertical distance of 2*Δb. Thus, the filter characteristics does not need to have a linear course, instead it is sufficient if the filter characteristics lies between the two straight lines 74a and 74b.

Figure 5:
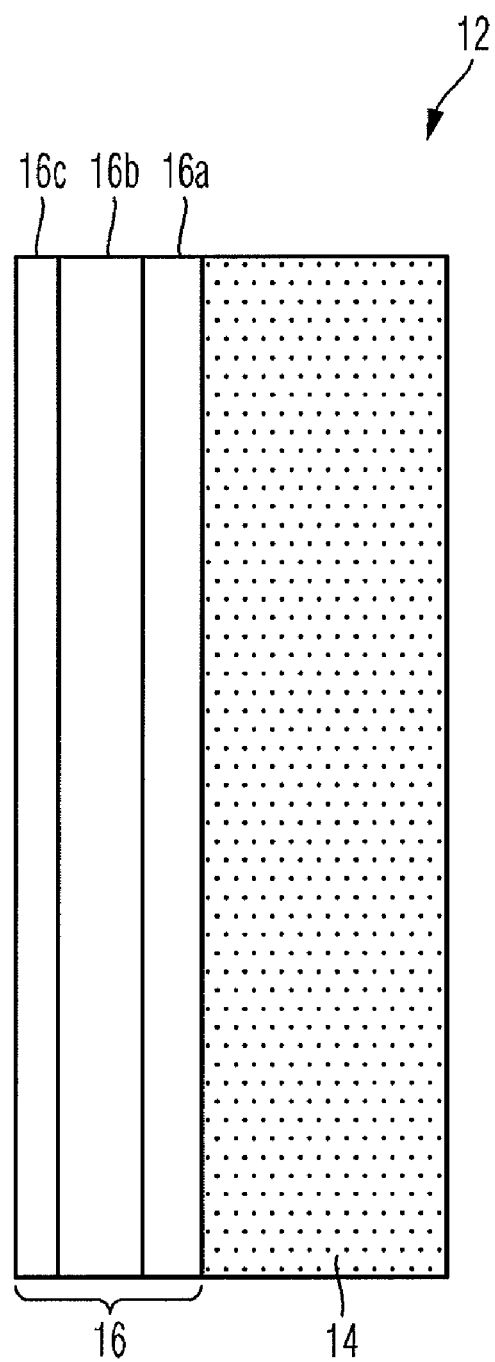
FIG. 5 schematically illustrates an embodiment of a spectral filter according to the present invention.

FIG. 5 shows an embodiment of the spectral filter 12 according to the present invention. The spectral filter 12 comprises a substrate 14 and a plurality of layers 16 of different dielectric materials, wherein the layers are mounted on the substrate. The layer 16a thereby comprises TiO2, the layer 16b comprises SiO2 and the layer 16b comprises TiO2. In the following table an exemplary sequence of layers of the spectral filter according to embodiments of the present invention is shown.

TABLE 2

| Layer No. | Process of Mounting | Material | Refractive Index | Thickness [nm] |
|---|---|---|---|---|
| 1 | APS | $TiO_2$ | 2.4825 | 50 |
| 2 | APS | $SiO_2$ | 1.4698 | 60 |
| 3 | APS | $TiO_2$ | 2.4825 | 38 |

In general, the refractive index is wavelength dependent. The refractive index indicated in the table above is the refractive index for a wavelength of 585 nm. The expression "APS" in the above table is an abbreviation for "ion supported vaporisation".

Summarized, embodiments of the present invention comprise a surgical microscopy system having an illumination system. The illumination system comprises a xenon gas discharge lamp and a spectral filter which is optionally positionable into an illumination beam path of the surgical microscopy system and removable from the same. The spectral filter substantially exhibits, in a wavelength range between 400 nm and 700 nm, a transmission increasing from about 0.12 to 1 having a rate of increase, i.e. a gradient, between 0.025/nm and 0.0035/nm, in particular 0.00293/nm. Thus, the illumination system is enabled to provide light having two different spectral characteristics which is advantageous in particular for imaging structures in the human eye scattering to a different degree.

While the invention has been described with respect to certain exemplary embodiments thereof, it is evident that many alternatives, modifications and variations will be apparent to those skilled in the art. Accordingly, the exemplary embodiments of the invention set forth herein are intended to be illustrative and not limiting in any way. Various changes may be made without departing from the spirit and scope of the present invention as defined in the following claims.

What is claimed is:

1. A surgical microscopy system, comprising:
    an illumination system for illuminating an object region with illumination light along an illumination beam path, and
    an optical imaging system for generating an image of the object region;
  wherein the illumination system comprises:
    a xenon gas discharge lamp for generating at least the illumination light; and
    a spectral filter which is optionally positionable in the illumination beam path and removable from the same,
    wherein the spectral filter has a filter characteristics which, for a wavelength range between 400 nm and 700 nm, satisfies the relations:

$$f*(m*\lambda+b-\Delta b) \leq A(\lambda) \leq f*(m*\lambda+b+\Delta b);$$

$0.0025/nm \leq m \leq 0.0035/nm$;
    $b = -1.053$;
    $f \leq 1$; and
    $\Delta b \leq 0.3$;
    wherein it is set $A(\lambda)=0$, if $A(\lambda)$ is smaller than zero according to the above relations, wherein it is set $A(\lambda)=f$, if $A(\lambda) \geq f$ according to the above relations, and wherein $\lambda$ represents a wavelength of the illumination light, and $A(\lambda)$ represents a ratio between an intensity of light emanating along the illumination beam path from the spectral filter and an intensity of light coming from the xenon gas discharge lamp being incident onto the spectral filter.

2. The surgical microscopy system according to claim 1, wherein the parameter m satisfies the relation $0.00275/nm \leq m \leq 0.00325/nm$.

3. The surgical microscopy system according to claim 1, wherein the parameter $\Delta b$ satisfies the relation $\Delta b \leq 0.075$.

4. The surgical microscopy system according to claim 1, wherein the spectral filter is a transmission spectral filter.

5. The surgical microscopy system according to claim 1, wherein the spectral filter comprises a substrate and a plurality of layers having different dielectric materials, wherein the layers are mounted on the substrate.

6. The surgical microscopy system according to claim 1, further comprising a user interface for positioning the spectral filter into the illumination beam path and for removing the spectral filter from the illumination beam path by a user.

7. The surgical microscopy system according to claim 1, wherein the illumination system comprises a light duct for guiding light along at least a portion of the illumination beam path.

8. The surgical microscopy system according to claim 1, wherein the illumination system further comprises a LED for generating light in a wavelength range between 400 nm and 850 nm, wherein the light of the LED is combinable with the light of the xenon gas discharge lamp.

9. The surgical microscopy system according to claim 1, further comprising an actuator, to position the spectral filter into the illumination beam path and to remove the spectral filter from the illumination beam path.

10. The surgical microscopy system according to claim 1, wherein the illumination system is adapted to direct the illumination light, for illuminating the object region, onto the object region according to an illumination light angle, wherein the illumination light angle measured between an optical axis of the imaging system and an optical axis of an illumination optics having the spectral filter positioned in the illumination beam path is the same as the illumination light angle having the spectral filter removed from the illumination beam path.

11. The surgical microscopy system according to claim 1, wherein the filter characteristics of the spectral filter satisfies for wavelengths below 400 nm the relation $A(\lambda) \leq f^*0.1$, and satisfies for wavelengths above 700 nm substantially the relation $A(\lambda)=f$.

12. A method for imaging an object region, the method comprising:
   illuminating the object region along an illumination beam path with illumination light, and
   imaging the object region;
   wherein light of a xenon gas discharge lamp is used as illumination light which is filtered by a spectral filter,
   wherein the spectral filter has a filter characteristics which, for a wavelength range between 400 nm and 700 nm satisfies the relations $$f^*(m^*\lambda+b-\Delta b) \leq A(\lambda) \leq f^*(m^*\lambda+b+\Delta b);$$

$0.0025/\text{nm} \leq m \leq 0.0035/\text{nm}$;
   $b=-1.053$;
   $f \leq 1$; and
   $\Delta b \leq 0.3$;

wherein it is set $A(\lambda)=0$, if $A(\lambda)$ is smaller than zero according to the above relations, wherein it is set $A(\lambda)=f$, if $A(\lambda) \geq f$ according to the above relations, and
   wherein $\lambda$ represents a wavelength of the illumination light, and $A(\lambda)$ represents a ratio between an intensity of light emanating along the illumination beam path from the spectral filter and an intensity of light coming from the xenon gas discharge lamp being incident onto the spectral filter.

13. The method according to claim 12, wherein the object region is at least a portion of a human eye.

14. A method comprising: the step of imaging an object region using a surgical microscopy system according to claim 1.

15. The method according to claim 12, further comprising removing the spectral filter from the illumination beam path.

16. The surgical microscopy system according to claim 1, wherein the parameter $\Delta b$ satisfies the relation $\Delta b \leq 0.15$.

17. The surgical microscopy system according to claim 1, wherein the parameter $\Delta b$ satisfies the relation $\Delta b \leq 0.1$.

18. The method according to claim 12, wherein the parameter $\Delta b$ satisfies the relation $\Delta b \leq 0.15$.

19. The method according to claim 12, wherein the parameter $\Delta b$ satisfies the relation $\Delta b \leq 0.1$.

* * * * *